United States Patent
Piekarz et al.

(10) Patent No.: US 7,516,012 B2
(45) Date of Patent: Apr. 7, 2009

(54) NAVIGATION SYSTEM AND METHOD FOR UPDATING SOFTWARE ROUTINES AND NAVIGATION DATABASE INFORMATION

(75) Inventors: Roman Piekarz, Mielec (PL); Henryk Bury, Lohne (DE)

(73) Assignee: Bury Sp. Z.o.o., Mielec (PL)

( * ) Notice: Subject to any disclaimer, the term of this patent is extended or adjusted under 35 U.S.C. 154(b) by 548 days.

(21) Appl. No.: 11/138,648

(22) Filed: May 27, 2005

(65) Prior Publication Data

US 2006/0271289 A1 Nov. 30, 2006

(51) Int. Cl.
G01C 21/00 (2006.01)

(52) U.S. Cl. .................. 701/213; 701/200; 701/211
(58) Field of Classification Search ......... 701/200–202, 701/208, 211–215; 340/988, 995.1, 998; 342/357.06, 357.12

See application file for complete search history.

(56) References Cited

U.S. PATENT DOCUMENTS 6,182,006 B1 * 1/2001 Meek .......................... 701/200
6,915,206 B2 * 7/2005 Sasajima ..................... 701/208

FOREIGN PATENT DOCUMENTS

GB 2412254 A * 9/2005

* cited by examiner

Primary Examiner—Yonel Beaulieu
(74) Attorney, Agent, or Firm—Whitham Curtis Christofferson & Cook, PC

(57) ABSTRACT

A navigation system includes a housing incorporating an electrical connector, a display, a memory reading device, and a computing means connected to the display. The computing means calculates a route from a selectable starting location to a selectable end location. A user is lead along the calculated route to the selected end location by displaying route information on the display. The housing is removably attached to a base member. The base member is mounted to a dashboard of a vehicle. A power supply cable is led out of the base member and has a plug at its end which projects outwardly for connecting to a respective power supply socket of the vehicle. A satellite position detection receiver is connected to the base member for determining actual location. An electrical connector leads at least a signal of the satellite position detection receiver and the supply power into the housing.

9 Claims, 3 Drawing Sheets

NAVIGATION SYSTEM AND METHOD FOR UPDATING SOFTWARE ROUTINES AND NAVIGATION DATABASE INFORMATION

BACKGROUND OF THE INVENTION

1. Field of the Invention

The invention relates to a navigation system for additionally mounting into a vehicle and routing the driver of the vehicle to an end position and optionally to intermediate positions from a starting point. The invention is further related to a method for updating software routines and navigation database information stored in a memory card intended for use in a navigation system.

2. Background Description

Navigation systems for mounting in vehicles are well known in the prior art. They are provided for onboard navigation based upon geographical data stored in a database burned onto a CD-Rom. Further, navigation systems are known which comprise a communication unit for sending a routing calculation request to a service provider and receiving a calculated route from the service provider. This method is known as offboard navigation.

Many navigation systems require a fixed installation into a vehicle, so that the navigation systems can not be easily removed out of the vehicle. Thus, the navigation systems are not provided for use in leasing or rental cars. Further, handheld navigation systems programmed onto a portable computer, e.g., a personal digital assistant (PDA), are known, which can be used everywhere without installation. However, these handheld navigation systems are not specialized navigation systems and uncomfortable in use.

SUMMARY OF THE INVENTION

It is therefore an object of the present invention to provide an improved navigation system, which is specialized for navigation and can be easily mounted or removed from a car, wherein the navigation system provides an improved user interface.

It is a further object of the present invention to provide an improved method for updating software routines and navigation database information stored in a memory card intended to use in a navigation system.

This and other objects are achieved by the navigation system comprising:
   a housing incorporating,
   an electrical connector,
   a display,
   a memory reading device, and
   computing means connected to the display and provided for calculating a route from a selectable starting location to a selectable end location and leading an user along said calculated route to the selected end location by displaying route information on the display,
   said housing being removable attached to a base member, said base member comprising means for mounting the base member to a dashboard of a vehicle,
   wherein a power supply cable is led out of the base member, said power supply cable having a plug at the end of the power supply cable projecting out of the housing for connecting the power supply cable to a respective power supply socked of the vehicle, and
   wherein a satellite position detection receiver for determination of the actual position of the satellite position detection receiver is connectable to said base member, said base member comprising an electrical connector for engagement with the electrical connector of the housing and being provided for leading at least a signal of the satellite position detection receiver and the supply power into the housing.

The navigation system can be easily installed into a vehicle and later removed by incorporating the display, the computing means and the memory reading device into a housing being removably attached to a base member connectable to power supply and a satellite position detection receiver, such as a satellite receiver for the global positioning system GPS, GLONASS etc. The navigation system comprises only a view separate elements for connecting to each other.

In an improved embodiment, a remote control is provided for controlling operation of the navigation system. Then, a receiver means connected to the computing means is provided in the housing for receiving control signals of the remote control. The receiver means can be e.g. a radio frequency receiver or infrared receiver.

In another preferred embodiment, said memory reading device is provided for reading data stored into a compact flash memory card. The use of a compact flash memory card instead of a compact disc has the advantage, that the database and software routines for running the navigation systems can be easily updated.

In another improved embodiment, a metal plate is provided for supporting the satellite position detection receiver, wherein said metal plate is laid under an antenna of the satellite position detection receiver for improving the signal quality of the received signals by signal reflection of the metal plate.

In another improved embodiment, said base member is comprising a radio receiver and an antenna connected to said radio receiver. Said radio receiver is provided for extracting traffic messages from radio programs received by said radio receiver and forwarding extracted traffic messages to the computing means in the housing. By use of the traffic messages, a dynamic routing can be performed by the computing means in order to recalculate and to optimize the route, when obstructions are found on the route.

Thus, it is preferable, if said computing means are provided for dynamic route calculation for adapting a calculated route to obstructions occurring at the calculated route and recalculating the route in case of occurrence of at least one obstruction.

In another improved embodiment, said housing incorporates an audio signal amplifier and at least one loudspeaker connected to the audio signal amplifier, wherein said computing means supplying audio control signals to said audio signal amplifier for acoustic routing. Thus, the driver is led through the route not only by displaying the route at the display in the housing, but also by use of acoustic signals.

The object is further achieved by the navigation system, wherein the computing means being controlled by software routines stored on a memory card readable by means of the memory reading device, wherein said memory card also comprising at least one navigation database comprising geographical information for route calculation and wherein an update routine is provided for updating the software routines and navigation data base, when the memory card is connected to a computer, the computer comprising at least one data file containing update information. Thus, by use of the memory card, the software routines and databases stored onto the memory card can be easily updated simply by storing update information onto the memory card by use of an external computer.

In an improved embodiment of said navigation system, the update process is performed by use of a communication link to an update server. Then, the external computer is connected to the update server via the internet in order to download update information to the computer and running an update routine for updating the software routines and/or database information on the memory card based upon the downloaded update information.

The object is further achieved by a method for updating software routines and navigation data base information stored in a memory card intended to use in a navigation system, wherein said method comprising the steps of:
a) connecting the memory card to a memory card reader of a computer,
b) updating the software routines and navigation database information by use of update data stored in a memory device, said computer device having access to the memory device.

A further improved method has the steps of:
a) connecting the computer to an update server via the internet,
b) transferring update data from the update server to the computer,
c) updating the software routines and navigation database information by use of the transferred update data.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF THE PREFERRED EMBODIMENTS OF THE INVENTION

Figure 1:
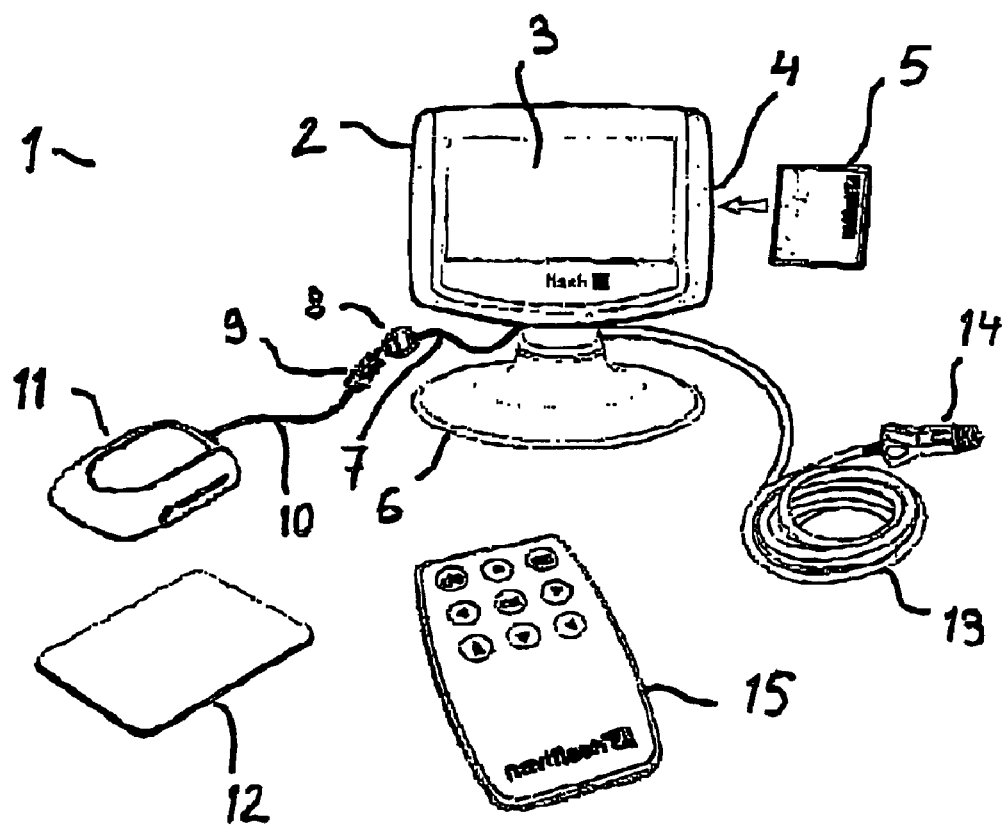
FIG. 1 is a schematic diagram of an embodiment of the navigation system of the present invention.

FIG. 1 gives an general overview of an embodiment of the navigation system 1 according to the present invention. A navigation system 1 consists of seven parts. The main part is a housing 2 comprising a display 3 and a computing means (not shown). The computing means is connected to a memory reading device 4 for reading data stored onto a memory device 5, such as a compact flash card.

The display 3 shows the pictograms for the direction the user has to turn off (right, left, rotary exit, etc.). The memory device 5 stores the map data to be read by the computing means in order to calculate a route from a point of origin to a destination and optionally via intermediate destinations.

In addition, a loudspeaker connected to an audio signal amplifier is placed in the housing 2 to release audio commands of the computing means.

The housing 2 can be removable attached to a base member 6, wherein the base member 6 and the housing 2 comprises electrical connectors for leading power and electrical signals from the base member 6 to the electronic circuits inside the housing 2.

The base member 6 can be fixed with a bonding sheet on the dashboard of a vehicle. Optionally, a vacuum holder or holes for screwing the base member 6 to a base can be provided at the base member 6.

A GPS signal cable 7 comes out of the base member 6 having a connector 8 at the free end and being connected to the electrical connector of the base member 6. A plug 9 at the end of a connection cable 10 of a satellite position detection receiver 11 is provided for connection to the plug 8, so that position signals indicating the actual position of the satellite position detection receiver 11 can be transferred to the computing means inside the housing 2. The satellite position detection receiver 11 is provided for detection of the actual position based upon satellite signals, e.g. by use of the global positioning system GPS.

To achieve a better reception of the satellite signals, a small metal plate 12 is provided to be laid under the magnetic GPS antenna of the satellite position detection receiver 11. However, the satellite position detection receiver 11 can be attached to the metal frame of the vehicle as well. In this case, the metal plate 12 is not necessary.

The operation voltage for the navigation system 1 is provided by a power supply cable 13, which comes out of the base member 6. Said power supply cable 13 has a plug 14 for connection to a cigarette socked of the vehicle.

To operate the navigation system 1, a infrared remote control 15 is provided, wherein a corresponding infrared receiver means connected to the computing means is incorporated in the housing 2.

Inside the base member 6 is a radio antenna incorporated for receiving radio signal. The radio antenna is connected to a radio receiver, which is built into the base member 6 or the housing 2. Said radio receiver has a tuner for automatically receiving traffic message signals, wherein the radio receiver automatically extracts traffic message signals and transfers the extracted traffic message signals to the computing means of the navigation system 1.

Optionally, the radio antenna and the radio receiver can be both incorporated into the housing 2.

Further, the satellite position detection receiver 11 can be incorporated into the housing 2. Then, the external connection cable 7 is unnecessary.

In the following the main menu of the navigation system 1 is explained by use of the flow diagram of FIG. 2.

The main menu comprises the four main points to be selectable, which are
a) traffic message channel TMC,
b) SETUP of the navigation system 1,
c) ROUTE,
d) GPS.

The menu TMC allows for selection of traffic message channels, i.e. radio channels comprising traffic messages TMC along a specified route. In this menu, e.g. highways or parts of a highway can be selected, which are combined to radio programs. The next entry "List is empty" in the menu "TMC" indicates, that no entry is entered into the radio program list. The menu "DETAILS" allows for showing details of available radio channels comprising traffic messages and the menu "OK" allows for returning to the main menu.

The menu "SETUP" allows for entry of basic setup data for the navigation system. The following menus are available:

Main setup-menu: route; display; audio; language; system; info; yes; no; safe settings.

Sub-menu "ROUTE": optimizing; shorters; fasters; TMC: dynamic; passive; highways; tall roads; include; exclude; time info to destination; arrival time.

Sub-menu "DISPLAY": brightness; contrast: day/night, day, night; auto (D); auto (M); 180° flip.

Sub-menu "AUDIO": navigation; phone; Galr; radio mute: by navigation, by phone; mute delay; navigation mute; audio switchbox.

Sub-menu "LANGUAGE": loading language; the language has been loaded.

Sub-menu "SYSTEM": time; timezone; summer time; tire change; reset calibration; suspend time; simulation; gyroangle; gyroinvert; external connection: yes, no.

Sub-menu "INFO": service info; version info; sensor info; tacho calibrated; gyro calibrated; tachomal function; gyromal function; hardware info; tacho; gyro; mute in; lights; RFLS; ignition.

Figure 2:
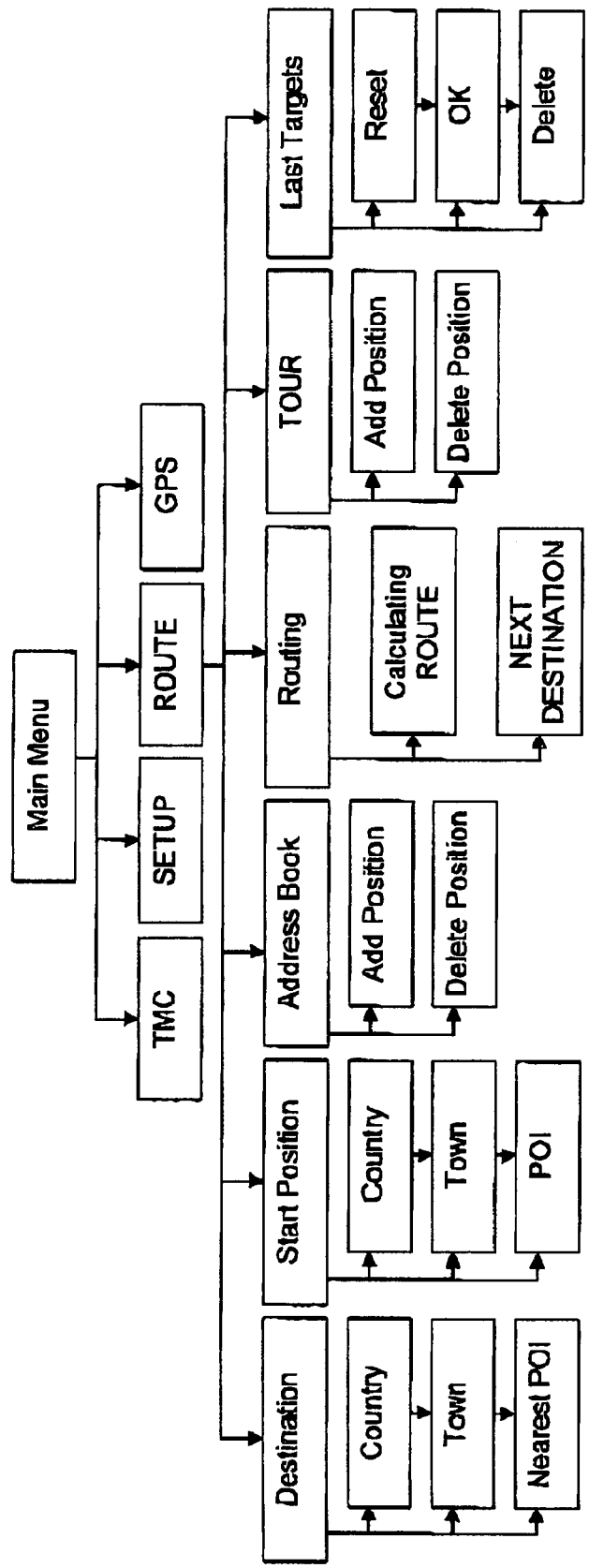
FIG. 2 is a flow diagram of a part of the main menu.

The main-menu "ROUTE" is shown in more detail in FIG. 2.

The sub-menu "DESTINATION" allows for entering a new destination. The following is available in said menu: country; town; nearest points of interests.

The sub-menu "TOWN" offers the following selections: streets; POI; start route; enter destination; cross; house number; town; street; continent; country; federal state; canton; autonomy; region; province; department; district; arrondissement; amt, fylke; county; commune; paresh; communal; quarter; cross.

The sub-menu POI offers the following: airport; cardiler; city center; company; embassy; entertainment; ferry terminal; frontier crossing; government office; hospital; hotel; open car park; car park garage; petrol station; police station; post office; railway station; rent a car; rest area; restaurant; shop center; stadium.

The sub-menu "ADDRESS BOOK" offers the following: new; ok; edit; find; list is full; list is empty.

In a sub-menu of the "ADDRESS BOOK" it is possible to add a position or to edit a position. Add position offers: new position; from last target; actual coordinates; unknown actual position. Edit offers rename; delete and delete position?.

The sub-menu "ROUTING" offers: calculating route . . . ; please observe RTR; cancel route; end call; ESC; no GPS data; wait for GPS data; destination has been reached; off road.

A sub-menu "ROUTE MENU" offers: nearest POI save actual position; route list; tour.

A sub-menu "TMC" offers the information: delay; to event: road blocked, reroute. Further, a next destination can be chosen, when an etappe has been reached.

The sub-menu "TOUR" offers to enter a new tour. The following selections are available: new; ok; edit; move; list is full; list is empty; add new position from address book; add new position from last targets; rename; delete; delete position?.

Another sub-menu "LAST TARGETS" offers the following selections: reset; ok, delete, list is empty; list is full; reset list?.

The sub-menu "GPS" allows for controlling the GPS receiver and selecting of position information as well as selecting additional information from the GPS receiver.

Figure 3:
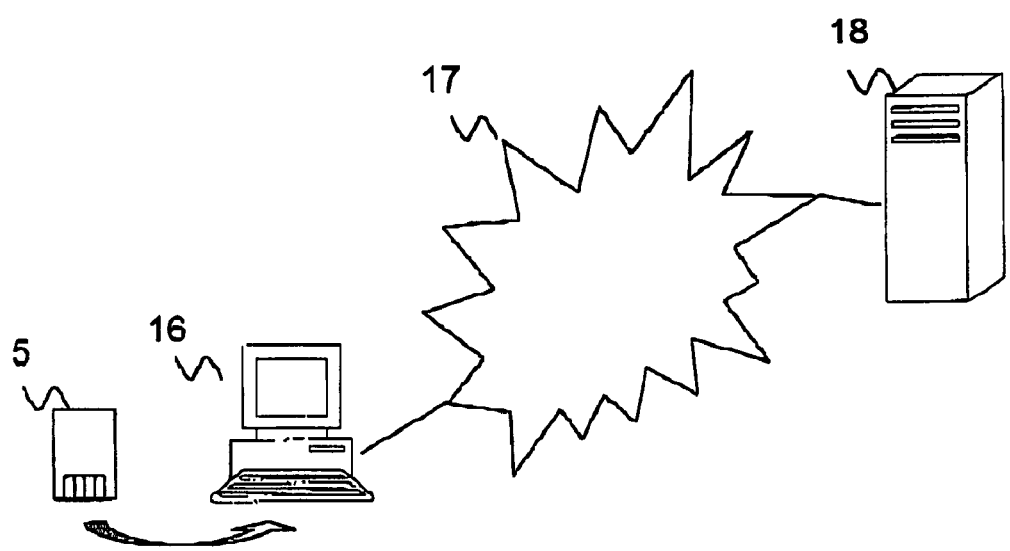
FIG. 3 is a schematic diagram of the update process.

The update of the software routines and navigation database information stored in the memory card 5, which is intended to be used in the navigation system 1 is shown in FIG. 3. To start the update process, the memory card 5 is connected to an external computer 16, which is connected via the internet 17 to an update server 18. Then, update data is transferred from the update server 18 to the computer 16 and intermediately stored into the computer 16. By running an update program onto the computer, the software routines, and/or navigation database information stored in the memory card 5 is updated by use of the update data, which have been downloaded from the update server 18.

Optionally, the memory card 5 can be updated by use of update data stored onto another memory device from the external computer 16 has access to.

By use of the memory card 5, the software routines and navigation data base information can be kept updated easily.

While the invention has been described in terms of its preferred embodiment, those skilled in the art will recognize that the invention can be practiced with modification within the spirit and scope of the appended claims.

What is claimed is:

1. Navigation system comprising:
    a housing incorporating an electrical connector,
    a display,
    a memory reading device, and
    computing means connected to the display and provided for calculating a route from a selectable starting location to a selectable end location and for leading an user along said calculated route to the selected end location by displaying route information on the display,
    said housing being removably attached to a base member, said base member comprising means for mounting the base member to a dashboard of a vehicle, wherein a power supply cable is led out of the base member, said power supply cable having a plug at the end of the power supply cable projecting out of the base member for connecting the power supply cable to a respective power supply socket of the vehicle, and wherein a satellite position detection receiver for determination of the actual position of the satellite position detection receiver is connectable to said base member, said base member comprising an electrical connector for engagement with the electrical connector of the housing and being provided for leading at least a signal of the satellite position detection receiver and the supply power into the housing, and
    wherein said base member comprises a radio receiver and an antenna connected to said radio receiver, said radio receiver providing for extracting traffic messages from radio programs received by said radio receiver and forwarding extracted traffic messages to the computing means in the housing.

2. Navigation system according to claim 1, wherein a remote control is provided for controlling operation of the navigation system, said housing comprising a receiver means connected to the computing means for receiving control signals of the remote control.

3. Navigation system according to claim 1, wherein said memory reading device being provided for reading a Compact Flash Memory Card.

4. Navigation system according to claim 1, wherein a metal plate is provided for supporting the satellite position detection receiver and being laid under an antenna of the satellite position detection receiver for signal reflection.

5. Navigation system according to claim 1, wherein said housing incorporates an audio signal amplifier and at least one loudspeaker connected to the audio signal amplifier, said computing means supplying audio control signals to said audio signal amplifier for acoustic routing.

6. Navigation system according to claim 1, wherein said computing means being provided for dynamic route calculation for adapting a calculated route to obstructions occurring at the calculated route and recalculating the route in case of occurrence of at least one obstruction.

7. Navigation system according to claim 1, wherein the computing means being controlled by software routines stored on a memory card readable by means of the memory reading device, said memory card also comprising at least one navigation database, and wherein an update routine is provided for updating the software routines and the navigation database, wherein the memory card is connected to a computer comprising at least one data file containing update information.

8. Navigation system according to claim 7, wherein the update routine is provided for updating the software routines and the navigation database by use of a communication link to an update server, when this memory card is connected to a computer and the computer is connected to update server via the internet.

9. Navigation system of claim 2 wherein said remote control provides infrared signals.

* * * * *